United States Patent
Xiong et al.

(10) Patent No.: US 7,660,285 B2
(45) Date of Patent: Feb. 9, 2010

(54) TRAFFIC-AWARE ROUTING IN WIRELESS NETWORKS

(75) Inventors: Yongqiang Xiong, Beijing (CN); Qian Zhang, Beijing (CN); Shouyi Yin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 558 days.

(21) Appl. No.: 11/170,712

(22) Filed: Jun. 29, 2005

(65) Prior Publication Data

US 2007/0002804 A1   Jan. 4, 2007

(51) Int. Cl.
*H04W 4/00*   (2009.01)
(52) U.S. Cl. .................... 370/338; 370/328; 370/310.2; 455/404; 455/424
(58) Field of Classification Search ................ 370/338, 370/328, 310.2; 455/403, 424
See application file for complete search history.

(56) References Cited

U.S. PATENT DOCUMENTS

| | | | |
|---|---|---|---|
| 6,907,243 B1 * | 6/2005 | Patel | 455/442 |
| 2002/0080768 A1 * | 6/2002 | Garcia-Luna-Aceves et al. | 370/349 |
| 2004/0158582 A1 * | 8/2004 | Takagi et al. | 707/104.1 |
| 2005/0239411 A1 * | 10/2005 | Hazra et al. | 455/67.11 |
| 2007/0153702 A1 * | 7/2007 | Alicherry et al. | 370/252 |

* cited by examiner

*Primary Examiner*—Nghi H Ly
(74) *Attorney, Agent, or Firm*—Lee & Hayes, PLLC (57) ABSTRACT

The routing of traffic in wireless networks is performed in accordance with a routing metric. The routing metric can reflect the effects of future self-traffic of a forthcoming communication flow. In a described implementation, a routing decision is made for a forthcoming communication flow that is to propagate over multiple nodes of a multi-hop wireless network. The routing decision is based on at least one predicted effect on the wireless network from self-traffic of the forthcoming communication flow.

6 Claims, 10 Drawing Sheets

TRAFFIC-AWARE ROUTING IN WIRELESS NETWORKS

BACKGROUND

Wireless networks, such as wireless mesh networks, are formed from multiple wireless nodes that interact together to forward communications from one node to the next until the destination is reached. Wireless mesh networks may be planned and constructed by a single entity such that each wireless node is intentionally located so as to create a carefully organized network having a desired set of properties. Wireless mesh networks may also be created in an ad hoc fashion when they are "spontaneously" generated from multiple wireless nodes that are provided by different, possibly non-cooperating, entities.

Regardless, wireless networks, such as wireless mesh networks, are capable of propagating a communication from a source wireless node to a destination wireless node by transmitting or forwarding the communication between one or more intervening wireless nodes. Examples of communications that wireless networks are capable of propagating are documents, emails, transactions, web-related exchanges, real-time communications (RTCs), and so forth.

As compared to wired networks, the wireless nature of wireless networks usually enables them to be constructed more quickly, more cheaply, and possibly with less inter-user cooperation, especially for spontaneously-created wireless mesh networks. However, wireless networks suffer from a number of deficiencies as compared to wired networks. For example, wireless networks can experience (i) interference between and among different communications and (ii) rapidly-changing characteristics of the transmission medium. Either of these wireless network attributes can increase latency and/or decrease bandwidth.

Moreover, these attributes of wireless networks can be particularly harmful to RTCs because any changes to latency or bandwidth jeopardize the quality of service (QoS) involved in guaranteeing an RTC. Although RTCs are a popular application for network communications, it is unfortunately difficult to reliably provide an RTC over a wireless network, especially a wireless multi-hop mesh network.

SUMMARY

The routing of traffic in wireless networks is performed in accordance with a routing metric. The routing metric can reflect the effects of future self-traffic of a forthcoming communication flow. In a described implementation, a routing decision is made for a forthcoming communication flow that is to propagate over multiple nodes of a multi-hop wireless network. The routing decision is based on at least one predicted effect on the wireless network from self-traffic of the forthcoming communication flow.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

Real-time communication (RTC) is a popular application in wireless networks, including in wireless multi-hop networks. Wireless multi-hop networks are proliferating due to their decentralized nature and the prevalence of wireless devices that utilize so-called Wi-Fi technology (e.g., devices comporting with an IEEE 802.11 standard).

Wireless multi-hop networks face two major challenges: QoS provisioning and interference management. Firstly, RTC applications (e.g., voice over IP (VoIP), video conferencing, etc.) have critical delay and bandwidth requirements. They are therefore usually preferably serviced on a route having a high quality, especially in terms of delay. To better ensure that forthcoming RTC traffic for a new communication flow can be serviced at the requested or required QoS, wireless network predicts the path quality in advance before the traffic is actually accepted at a network node and propagated over the wireless network.

Secondly, in wireless multi-hop networks, interference is often a key factor impacting the overall network performance that is related to wireless channel characteristics. This interference imposes additional challenges for RTC applications. For an RTC traffic flow that is to be routed in a wireless multi-hop network, in addition to general interference arising from the physical environment, two types of wireless traffic also interfere with the RTC flow. These two types of wireless traffic are: (i) neighboring traffic, including the traffic across a given node from other flows as well as the traffic from the other flows on adjacent nodes and (ii) the traffic from the RTC flow under consideration (which is referred to herein as "self-traffic") along the path on the same channel.

Figure 1:
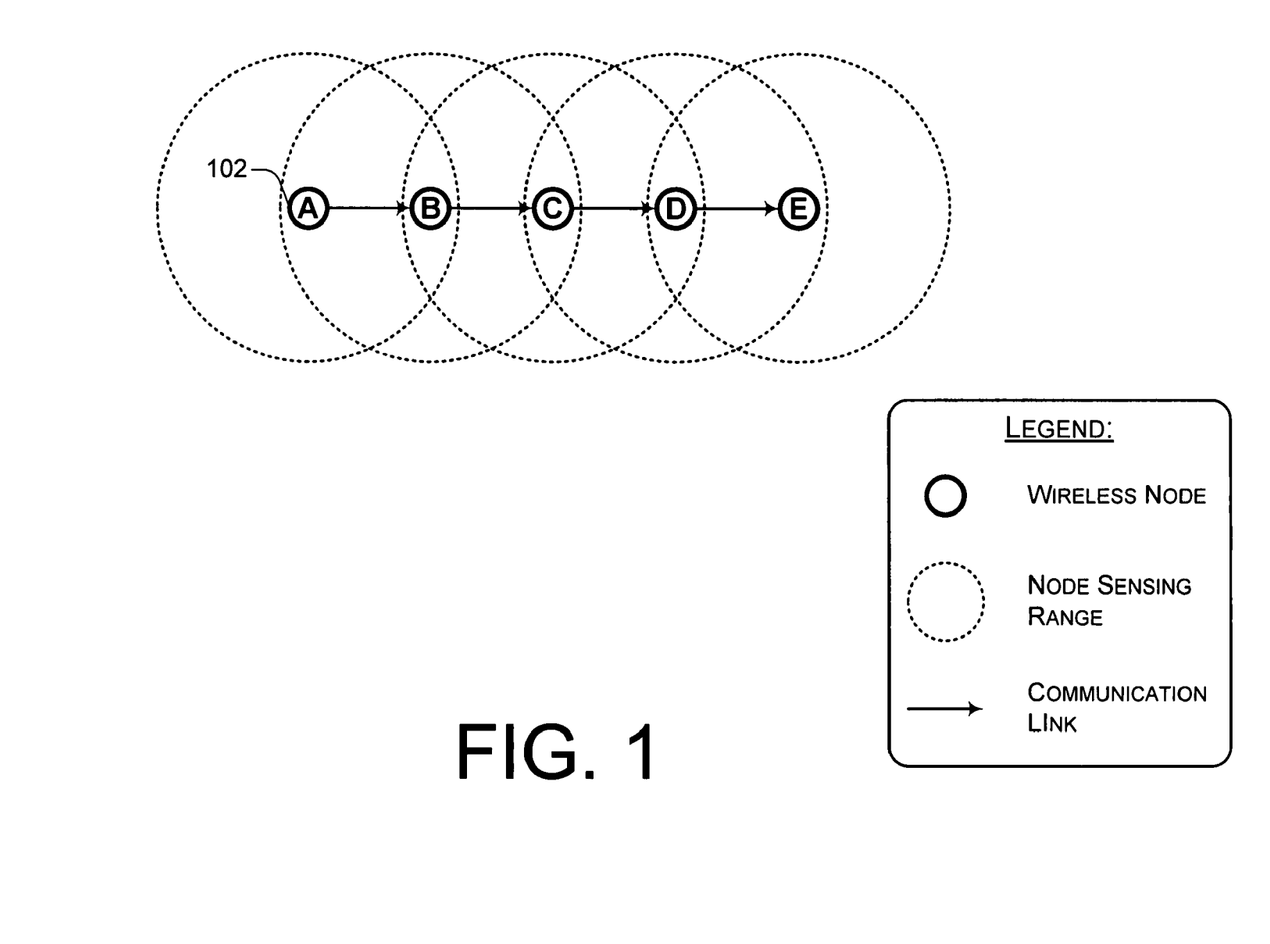
FIG. 1 illustrates an example of how self-traffic interference can affect a communication path in a wireless multi-hop network.

FIG. 1 illustrates an example of how self-traffic interference can affect a communication path in a wireless multi-hop network. According to the legend, the solid circles represent wireless nodes 102, the dashed circles represent the sensing range of the wireless nodes, and each stylized arrow represents a communication link. As shown, there are five (5) wireless nodes 102: wireless node A, wireless node B, wireless node C, wireless node D, and wireless node E. Each respective wireless node has a respective associated sensing range.

In the illustrated example communication path, RTC traffic flows from node A to node E, via nodes B, C, and D. More specifically, the traffic flows from node A to node B, from node B to node C, from node C to node D, and then from node D to node E. Traffic propagating on link A-B is interfered with by other traffic from the same communication flow that is propagating on link B-C and link C-D. Thus, self-traffic can impact (e.g., interfere with) the communication of a traffic flow.

Although the RTC traffic is sent from node A to node E along or via nodes B, C, and D, the following analysis focuses on the performance of the link from node A to node B. First, the RTC traffic flow being sent from node B to node C contends with the traffic being sent from node A on the same channel, which thus affects the RTC traffic on link A-B. Second, when node C is forwarding the RTC traffic to node D, node B cannot receive packets from node A, so transmission on link A-B is also affected by traffic on link C-D from the same RTC flow.

However, traditional measurement-based schemes cannot get an accurate estimation of the effects of self-traffic, especially for large-volume RTC traffic, because traditional measurement-based schemes rely on probing. When probing is performed for route selection, the RTC traffic flow is not yet injected into the wireless network, so the probing results cannot possibly account for the self-traffic interference that is generated after the RTC flow is injected into the wireless network.

On the contrary, for implementations described herein, in addition to the neighboring traffic, the effects of self-traffic are taken into account when estimating the quality of a potential path and selecting a communication route for an RTC based on predicted path quality. More specifically, a new media access control (MAC) model is introduced that achieves an accurate estimation of path quality. The new MAC model is especially suited for traffic flows that are stable or otherwise relatively predictable (such as RTC traffic). The foreseeable nature of such flows facilitates the prediction of the impact of currently nonexistent self-traffic in unsaturated networks.

In a described example quantitative implementation, a model is derived from an IEEE 802.11 MAC standard by considering that the rates of RTC traffic flows are typically well-controlled. This model enables a prediction of the path quality given both general interfering traffic and self-traffic information, as well as the physical wireless link condition as represented by, for example, the bit-error-rate (BER) or the signal-to-noise-ratio (SNR).

Thus, in an example implementation, a traffic-aware routing metric facilitates a quality prediction for forthcoming RTC traffic flows in wireless multi-hop networks by explicitly considering how both self-traffic and neighboring traffics will interfere with the forthcoming RTC flow after it is injected into the network. An end-to-end transmission time, which can also reflect the bandwidth, for each path under consideration is used as the quality metric. The proposed traffic-aware routing metric, the path predicted transmission time (PPTT), is related to the sum of the estimations of the delays on each link along the routing path based on the described MAC model. In contrast with measurement approaches, the described model approach enables a sufficiently-accurate prediction for both existing and forthcoming RTC flows.

In the model and routing metrics as described herein, the impact of the interfering traffics and the link condition are modeled. Furthermore, they can be classified according to different channels that are being used on different links. With this classification technique, selecting the same channel for adjacent nodes, which may lead to poor link quality, can be avoided. By enabling the radio or channel characteristic to be explicitly considered, the described routing metric can also be used as a unified metric for both single-radio and multi-radio wireless networks.

The description herein includes the following aspects. First, an RTC-applicable model to predict the transmission time for an RTC flow that is to be served in a multi-hop wireless network is described. After determining a predicted RTC transmission time, more accurate guidance for QoS related services can be offered. Second, by explicitly taking the self-traffic into account together with the neighboring traffic, a full traffic-aware routing metric that predicts the path quality in multi-hop networks is provided. Third, with the derivation of the PPTT, the analysis of single-radio and multi-radio networks is unified by differentiating traffics and links according to the channel on which they are transmitting. Consequently, PPTT can offer a unified routing metric for both single radio and multi-radio wireless networks.

This description is separated into three additional sections. A first section is related to FIGS. 2-4 and is entitled "General Qualitative Example Implementations for Traffic-Aware Routing in Wireless Networks". A second section is related to FIGS. 5-10 and is entitled "Specific Quantitative Example Implementations for Traffic-Aware Routing in Wireless Networks". There is also a third concluding section.

General Qualitative Example Implementations for Traffic-Aware Routing in Wireless Networks In this section, a prediction-based routing metric that explicitly considers different types of interfering traffics (e.g., neighbor traffic and self-traffic) that will interfere with the forthcoming communication flow is presented qualitatively. These interfering traffics can be classified as Carrier Sensing (CS) traffic or Hidden Terminal (HT) traffic according to their relative positions. CS traffic is the cumulative traffic (including both sending and receiving traffic) of all nodes that are in the carrier sensing range of a link's sender (i.e., the wireless node transmitting the traffic on a given link). In IEEE 802.11 wireless networks, for example, when a sender wishes to transmit a packet across a link, the sender competes with CS traffic for channel access. Consequently, a larger volume of CS traffic leads to a longer channel access time.

HT traffic is the cumulative traffic (including only the sending traffic) of all nodes that are in the carrier sensing range of a link's receiver (i.e., the wireless node receiving the traffic on a given link) but not in the carrier sensing range of the link's sender. A packet transmitted across the link may collide with the packets of HT traffic. Consequently, a larger volume of HT traffic causes more packets collisions, which results in a longer (re)transmission time. Considering the different impacts of CS traffic and HT traffic on link quality, they are differentiated by their locations. Differences between CS traffic and HT traffic are described further below with particular reference to FIG. 2.

Figure 2:
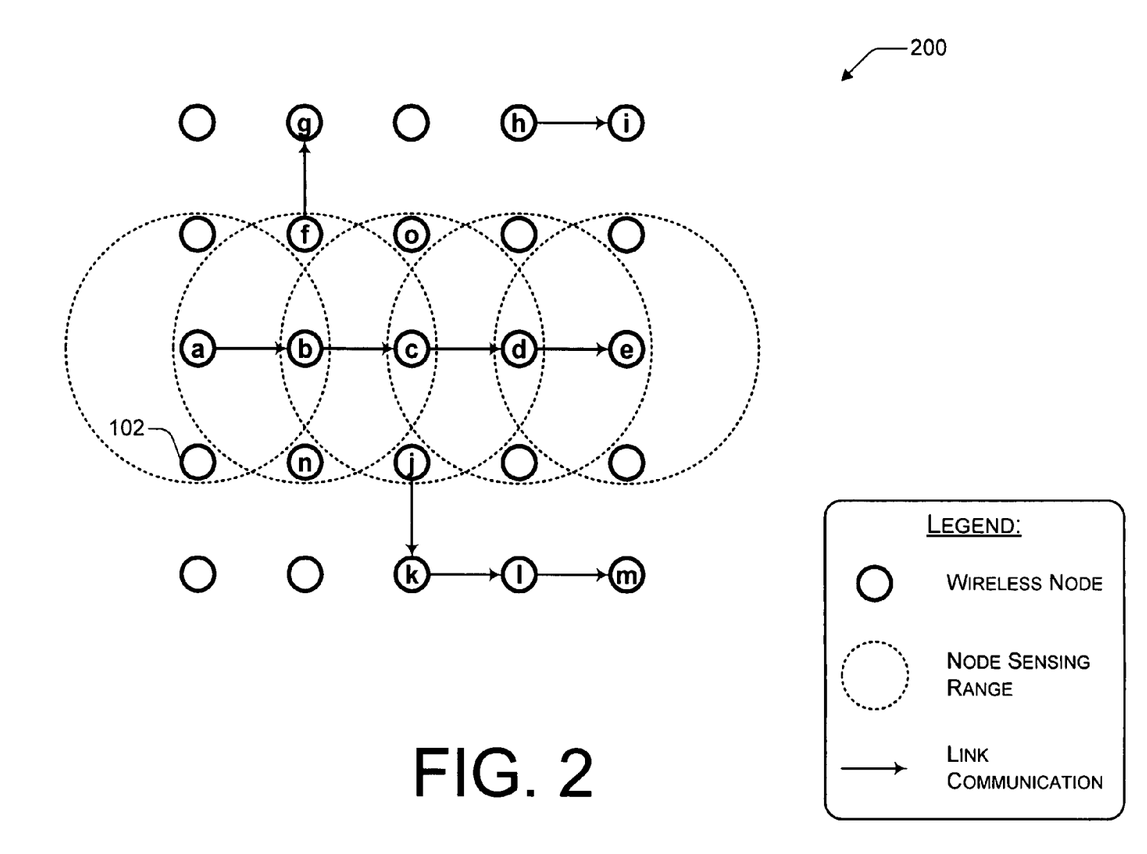
FIG. 2 is a 25-node wireless network that illustrates example differences between carrier sensing (CS) traffic interference and hidden terminal (HT) traffic interference with respect to a given communication path.

FIG. 2 is a 25-node wireless network that illustrates example differences between CS traffic interference and HT traffic interference with respect to a given communication path. More specifically, a 25-node grid-topology network 200 is used to illustrate the differentiation between interfering traffic types. For the sake of clarity, in this example network topology 200, the interference range and transmission range of all nodes is considered to be equal.

There are 25 wireless nodes 102 arranged in network 200. The 25 wireless nodes 102 are arranged in a five-by-five grid. Fifteen of the 25 wireless nodes 102 are labeled with lower-case letters a-o. The node sensing ranges, which are equivalent within network 200, are specifically illustrated for the five wireless nodes a-e.

There are four communication flows illustrated in the network. Flow a to e (a→e) is delivered via links (a, b), (b, c), (c, d) and (d, e). It has two neighboring flows, f→g and j→m, because node f and node j are in node b's and node c's carrier sensing range, respectively. Considering link (b, c), the CS traffic of this link includes flows a→b, c→d, and f→g because they are all in the carrier sensing range of the sender node b. The HT traffic of link (b, c) includes flows d→e and j→k because they are in the carrier sensing range of the receiver node c, but out of the carrier sensing range of the sender node b.

Using these concepts of HT traffic and CS traffic, the impact of self-traffic interference, which is two fold, can be further analyzed. Firstly, the self-traffic will enlarge the CS traffic volume of each link in the delivery path of the flow under consideration. For instance, the self-traffic of link (a, b) and link (c, d) are the self-traffic increments of the CS traffic of link (b, c). As a result, self-traffic interference increases the channel access time. Secondly, self-traffic will enlarge the HT traffic volume of some links in the path of the flow under consideration. For instance, the self-traffic of link (d, e) is the increment of the HT traffic of link (b, c). As a result, self-traffic interference causes more packet collisions, which in turn increases the packet retransmission time.

Thus, the interfering traffic, whether it is neighboring traffic or self-traffic, acts as either CS traffic or HT traffic. The CS and HT self-traffic impact the link quality, which results in increases to the packet transmission time. By considering traffic interference, a new time-based routing metric, termed Path Predicted Transmission Time (PPTT) herein, is described to explicitly account for different types of traffic interference, including the future or forthcoming effects of self-traffic. PPTT attempts to predict the end-to-end delay that will be introduced after the traffic of the flow under consideration starts to be delivered along the communication path. PPTT can thus be used as a routing metric for selecting a path from multiple potential paths.

Figure 3:
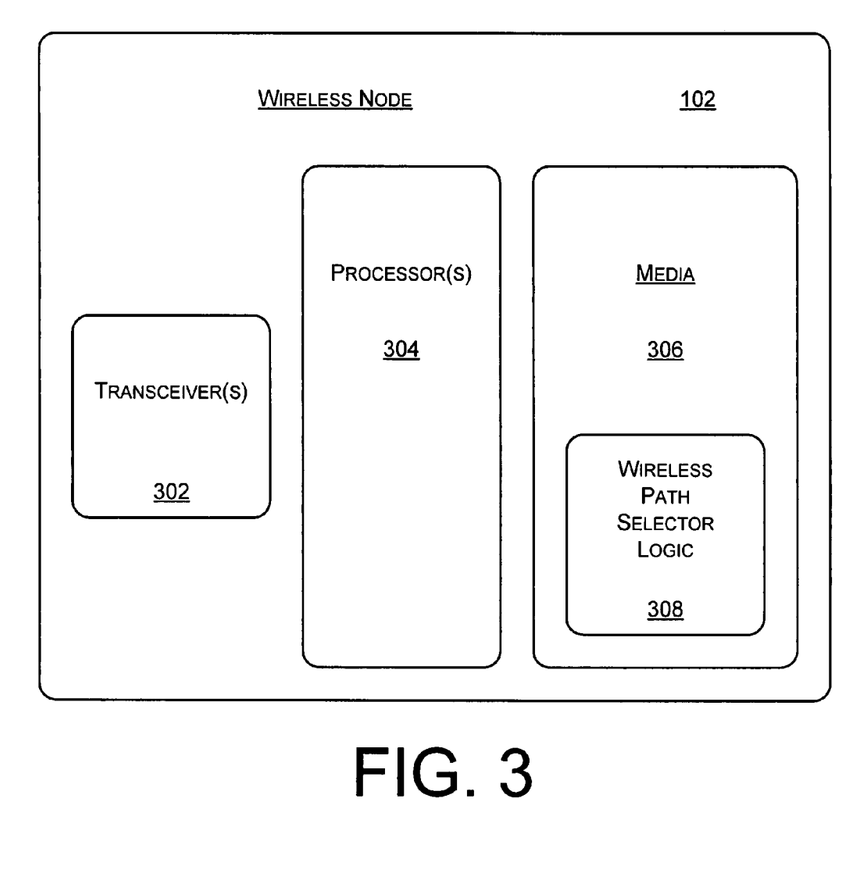
FIG. 3 is a block diagram of an example wireless node having wireless path selector logic.

FIG. 3 is a block diagram of an example wireless node 102 having wireless path selector logic 308. Wireless node 102 may comprise a wireless adapter, a wireless router, a computer with wireless capabilities, a combination thereof, and so forth. As illustrated, wireless node 102 includes one or more transceivers 302, one or more processors 304, and one or more media 306. Media 306 includes wireless path selector logic 308. Although not specifically illustrated, wireless node 102 may also include other components.

In a described implementation, processor 304 is capable of executing, performing, and/or otherwise effectuating processor-executable instructions. Media 306 is comprised of one or more processor-accessible media. In other words, media 306 may include processor-executable instructions that are executable by processor 304 to effectuate the performance of functions by wireless node 102.

Thus, realizations for traffic-aware routing in wireless networks may be described in the general context of processor-executable instructions. Generally, processor-executable instructions include routines, programs, coding, modules, protocols, objects, interfaces, components, metadata and definitions thereof, data structures, etc. that perform and/or enable particular tasks and/or implement particular abstract data types. Processor-executable instructions may be located in separate storage media, executed by different processors, and/or propagated over or extant on various transmission media.

Processor(s) 304 may be implemented using any applicable processing-capable technology. Transceiver(s) 302 may be realized as a transmitter and/or receiver (e.g., a radio) to enable transmission and/or reception, respectively, by wireless node 102. By way of example only, wireless node 102 may include a number of transceiver(s) 302 that are equal to a number of radio channels on which wireless node 102 is intended to be capable of simultaneously communicating.

Media 306 may be any available media that is accessible by wireless node 102. It includes volatile and non-volatile media, removable and non-removable media, and storage and transmission media (e.g., wireless or wired communication channels). Media 306 comprises wireless path selector logic 308. Such logic may generally comprise hardware, software, firmware, a combination thereof, and so forth. Wireless path selector logic 308 enables wireless node 102 to select a path for a forthcoming communication flow from multiple potential paths in manners as described herein, including responsive to self-traffic interference.

By way of example only, the path selection or routing decision may be based on at least one predicted effect from the self-traffic of a forthcoming communication flow that is under consideration. The predicted effect from the self-traffic of the communication flow may be predicted bandwidth consumption from the direct transmissions for the communication flow. The predicted effect from the self-traffic of the communication flow may also be predicted interference resulting from the self-traffic of the communication flow. The predicted interference from the self-traffic of the communication flow may arise from hidden terminal (HT)-type self-traffic and/or carrier sensing (CS)-type self-traffic.

Figure 4:
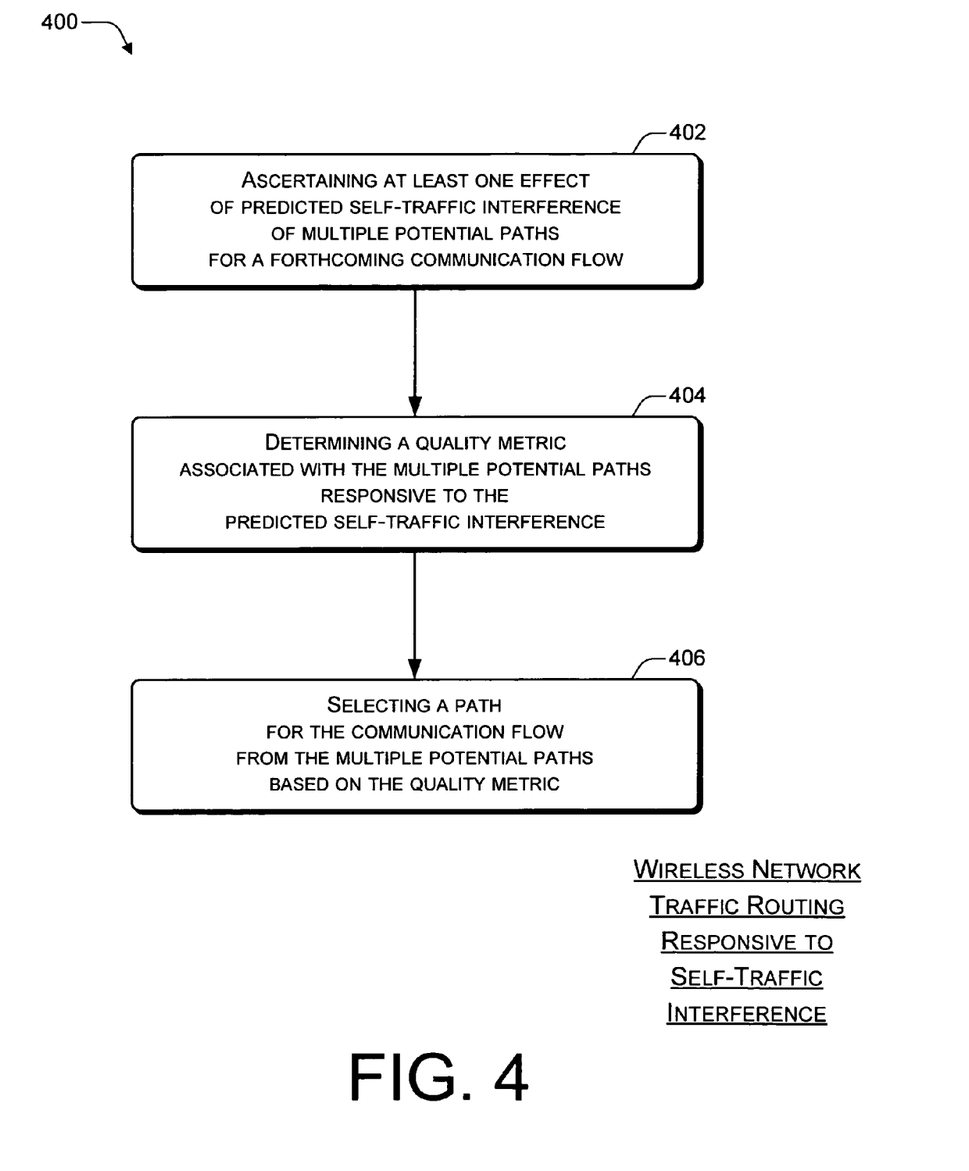
FIG. 4 is a flow diagram that illustrates an example of a qualitative method for wireless network traffic-aware routing responsive to self-traffic interference.

FIG. 4 is a flow diagram 400 that illustrates an example of a qualitative method for wireless network traffic-aware routing responsive to self-traffic interference. Flow diagram 400 includes three blocks 402-406. Although the actions of flow diagram 400 may be performed in other environments and with a variety of hardware and software combinations, FIG. 3 is used in particular to illustrate certain aspects and examples of the method. By way of example only, the actions of flow diagram 400 may be performed by wireless path selector logic 308 of a wireless node 102.

At block 402, at least one effect of predicted self-traffic interference of multiple potential paths is ascertained for a forthcoming communication flow. For example, an effect from predicted self-traffic interference for each potential path of multiple potential paths may be ascertained on a link-by-link and/or node-by-node basis. The ascertaining may entail, for instance, a carrier sensing factor (CSF) that reflects self-traffic interference resulting from other nodes in a particular potential path that are in a carrier-sensing range of a sending node of a given link and/or a hidden terminal factor (HTF) that reflects self-traffic interference resulting from other nodes in a particular potential path that are in a carrier-sensing range of a receiving node but not in that of a sending node of a given link. Specific examples of a CSF and an HTF are described further below in the section entitled "Specific Quantitative Example Implementations for Traffic-Aware Routing in Wireless Networks".

At block 404, a quality metric associated with the multiple potential paths is determined responsive to the predicted self-traffic interference. For example, a quality metric for each potential path of the multiple potential paths may be determined responsive to the predicted self-traffic interference of the flow under consideration. The quality metric may be, for instance, a PPTT, as described further below.

At block 406, a path for the communication flow from the multiple potential paths is selected based on the quality metric. For example, the path associated with the most superior quality metric (e.g., the shortest PPTT) may be selected for the forthcoming communication flow.

In a described implementation, to calculate PPTT, packet transmission time is predicted link-by-link. This link-oriented predicted packet transmission time is termed herein Link Predicted Transmission Time (LPTT). By summing the LPTT of each link, the PPTT that is associated with the whole path is determined. In an example implementation, the LPTT is defined as the time from the instant the packet enters the queue of the sender of a link to the instant the packet successfully reaches the receiver (or to the instant the packet is dropped). Consequently, LPTT comprises a queuing delay and a packet service time.

The queuing delay and the packet service time are thus predicted in an example implementation. Because communication flow packets may queue up for processing in the output buffer of a sending node, a queuing model may be employed to predict (e.g., estimate) the queuing delay. For example, an M/M/1 queuing model to calculate queuing delay may be used; however, other standardized or specially-developed queuing models may alternatively be employed. The packet service time is the time period that is consumed by the MAC layer when sending out a packet. It can be explicitly calculated with, for example, an RTC-oriented model, such as the one that is described further herein below in the section entitled "Specific Quantitative Example Implementations for Routing Traffic in Wireless Networks".

Generally, the packet transmission time on a given link is related to its HT traffic, its CS traffic, and its self-traffic. Hence, the LPTT can be represented as LPTT($\lambda_{cs}$, $\lambda_{ht}$, $\lambda$), where $\lambda$ is the traffic rate of the RTC flow and $\lambda_{cs}$ and $\lambda_{ht}$ denote the average CS traffic rate and HT traffic rate, respectively. The current CS traffic and HT traffic of neighboring interfering traffic flows can be obtained through any of many possible approaches, such as, for example, a one-hop signaling protocol.

However, to calculate LPTT, the CS traffic and the HT traffic that are obtained by analyzing the existing traffic information are not sufficient. The forthcoming CS traffic and HT traffic that are caused by self-traffic interference are thus added to the current CS and HT traffic. In short, the different values ($\lambda_{cs}$, $\lambda_{ht}$, $\lambda$) can be used to compute accurate LPTTs for corresponding links of a path, and then the LPTTs may be used to determine an accurate PPTT of the path. Selection of a path from multiple potential paths (i.e., a routing decision) may be made responsive to determined PPTTs that are associated with respective ones of the multiple potential paths.

Specific Quantitative Example Implementations for Traffic-Aware Routing in Wireless Networks In this section, an example approach to calculating LPTT and PPTT is described quantitatively. More specifically, a described approach provides an example RTC-targeted MAC model that utilizes a link-quality routing metric. The described path routing metric is the sum of individual link qualities, so any routing protocol that uses the described PPTT metric selects the path with the lowest or minimum path metric value; thus, the highest-quality path is selected.

This quantitative section is described primarily in terms of the MAC layer for IEEE 802.11. However, the principles described below are applicable to MAC layers for other protocols. Moreover, the principles described above in the qualitative section are applicable to traffic-aware routing in wireless networks generally.

Path Predicted Transmission Time (PPTT)

The path metric PPTT is calculated by summing each link's LPTT, which is related to LPTT($\lambda_{cs}$, $\lambda_{ht}$, $\lambda$). In this subsection, the focus is on calculating the potential CS traffic and HT traffic by considering the impact of self-traffic.

As noted above, CS traffic and HT traffic can arise from two sources: neighboring traffic and self-traffic. The former source may be collected by, for example, sending heart-beat packets periodically along the corresponding potential routing path under consideration. To derive the latter source, the impact of the forthcoming self-traffic on each link of the path is characterized first. The self-traffic along the path impacts each link by acting as CS traffic and/or HT traffic.

Two parameters, a Carrier Sensing Factor (CSF) and a Hidden Terminal Factor (HTF), are used to represent the self-traffic interference. The CSF of a link having a sender and a receiver is the number of other links in the path that are on the same channel and in the sender's CS range. The HTF of a link having a sender and a receiver is the number of other links in the path that are on the same channel and in the receiver's CS range, but not in the sender's CS range. For a link from node i to node j, the increased CS traffic due to self-traffic interference is $CSF_i \times \lambda$, and the increased HT traffic due to self-traffic interference is $HTF_i \times \lambda$, where $\lambda$ is the traffic rate of the forthcoming communication flow along the path.

For link (i, j), the neighboring CS traffic is denoted as $\lambda_{cs}$, and the neighboring HT traffic is denoted as $\lambda_{ht}$. Considering both the neighboring and the self-traffic interference, the CS traffic becomes $\lambda_{cs} + CSF_i \times \lambda$, and the HT traffic becomes $\lambda_{ht} + HTF_i \times \lambda$. Thus, the LPTT of the link from node i to node j, which includes both neighboring and self-traffic interference, may be represented by LPTT($\lambda_{cs} + CSF_i \times \lambda$, $\lambda_{ht} + HTF_i \times \lambda$, $\lambda$).

The CSF and HTF can be determined, for example, according to the carrier sensing range ($R_{CS}$) and the transmission range ($R_{TX}$). For the first and last links of a path, the CSF is $R_{CS}/R_{TX}$. For other links of the path, the CSF is $2R_{CS}/R_{TX}$. For the last two links of the path, the HTF is zero. For the other links of the path, the HTF is $R_{CS}/R_{TX}$.

For an n-hop potential path, the CSF and the HTF can be obtained for each link of the path according to the link's position in the path. By summing the LPTT of each link of the potential path, the predicted transmission time of a whole potential path can be determined by:

$$PPTT(\lambda) = \sum_{i=1}^{n} LPTT_i(\lambda_{cs_i} + CSF_i \times \lambda, \lambda_{ht_i} + HTF_i \times \lambda, \lambda), \quad (1)$$

where λ is the average traffic rate of the communication flow (e.g., the expected average traffic rate of an RTC) to be injected into a wireless multi-hop network.

Figure 5:
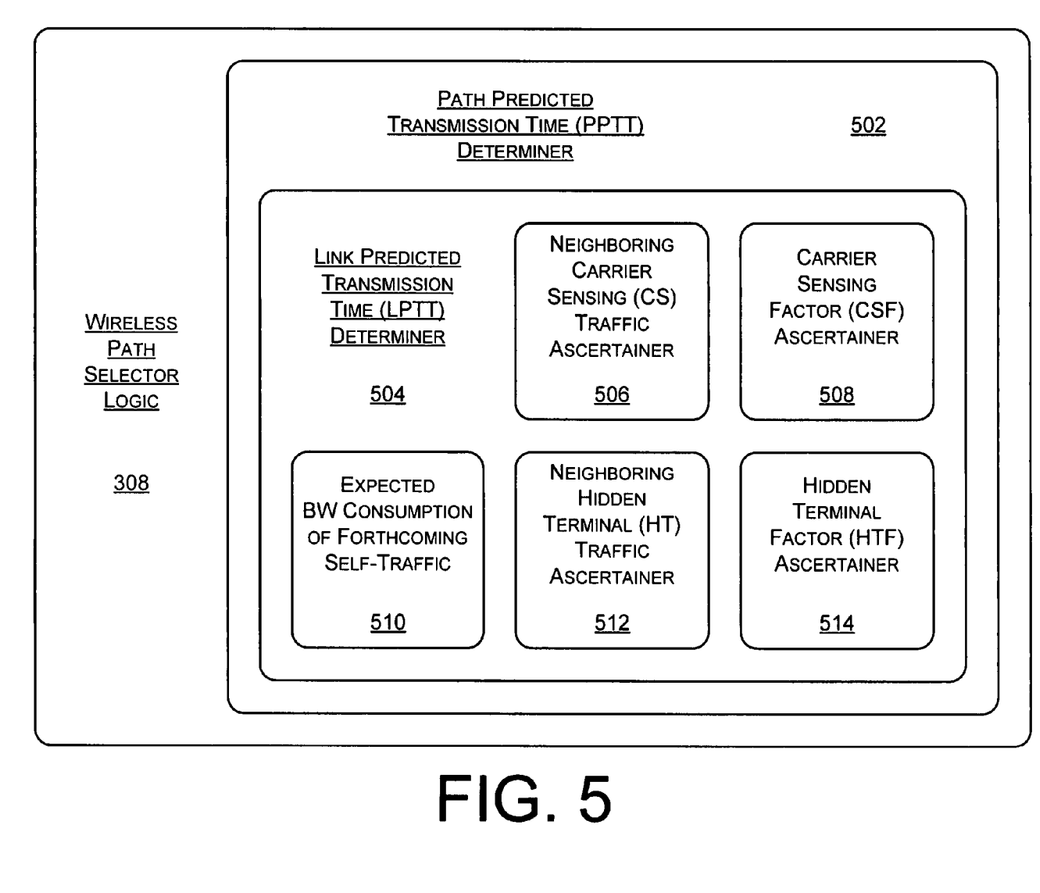
FIG. 5 is a block diagram example of wireless path selector logic having a carrier sensing factor (CSF) ascertainer and a hidden terminal factor (HTF) ascertainer.

FIG. 5 is a block diagram example of wireless path selector logic 308 having a CSF ascertainer 508 and an HTF ascertainer 514. As illustrated, wireless path selector logic 308 includes a PPTT determiner 502, which includes an LPTT determiner 504. LPTT determiner 504 comprises a neighboring CS traffic ascertainer 506, a neighboring HT traffic ascertainer 512, CSF ascertainer 508, and HTF ascertainer 514. LPTT 504 also has knowledge of the expected bandwidth consumption of forthcoming self-traffic 510 of the future communication flow under consideration.

In a described implementation, wireless path selector logic 308 is adapted to select a path from multiple respective potential paths based on respective associated PPTTs as determined by PPTT determiner 502. Each PPTT is determined from the LPTTs corresponding to links of the associated potential path. Thus, PPTT determiner 502 may determine PPTTs in accordance with equation (1) above. The LPTTs are determined by LPTT determiner 504.

LPTT determiner 504 determines LPTTs using neighboring CS traffic ascertainer 506, CSF ascertainer 508, expected bandwidth consumption of forthcoming self-traffic 510, neighboring HT traffic ascertainer 512, and HTF ascertainer 514. Neighboring CS traffic ascertainer 506 ascertains $\lambda_{cs}$, and neighboring HT traffic ascertainer 512 ascertains $\lambda_{ht}$. CSF ascertainer 508 ascertains CSF, and HTF ascertainer 514 ascertains HTF. Expected bandwidth consumption of forthcoming self-traffic 510 corresponds to λ. Thus, LPTT determiner 504 may determine LPTTs in accordance with LPTT $(\lambda_{cs_i} + CSF_i \times \lambda, \lambda_{ht_i} + HTF_i \times \lambda, \lambda)$.

Link Predicted Transmission Time (LPTT)

The LPTT is the value of a prediction of packet transmission time across a given link. A packet that is to be transmitted over a link first enters the sender node's queue to wait to be sent out. When the packet departs the queue, it enters the MAC layer. Thus, the LPTT includes a queuing delay and the MAC layer processing time. The MAC layer processing time is also referred to herein more generally as the packet service time.

There are therefore two parts to determining an LPTT: queuing delay and packet service time. Considering the traffic pattern of RTC traffic, for example, the queuing delay can be calculated according to any applicable queuing model (e.g., an M/M/1 queuing model). The other part of determining LPTT is the calculation of the packet service time, which is described further below.

Figure 6:
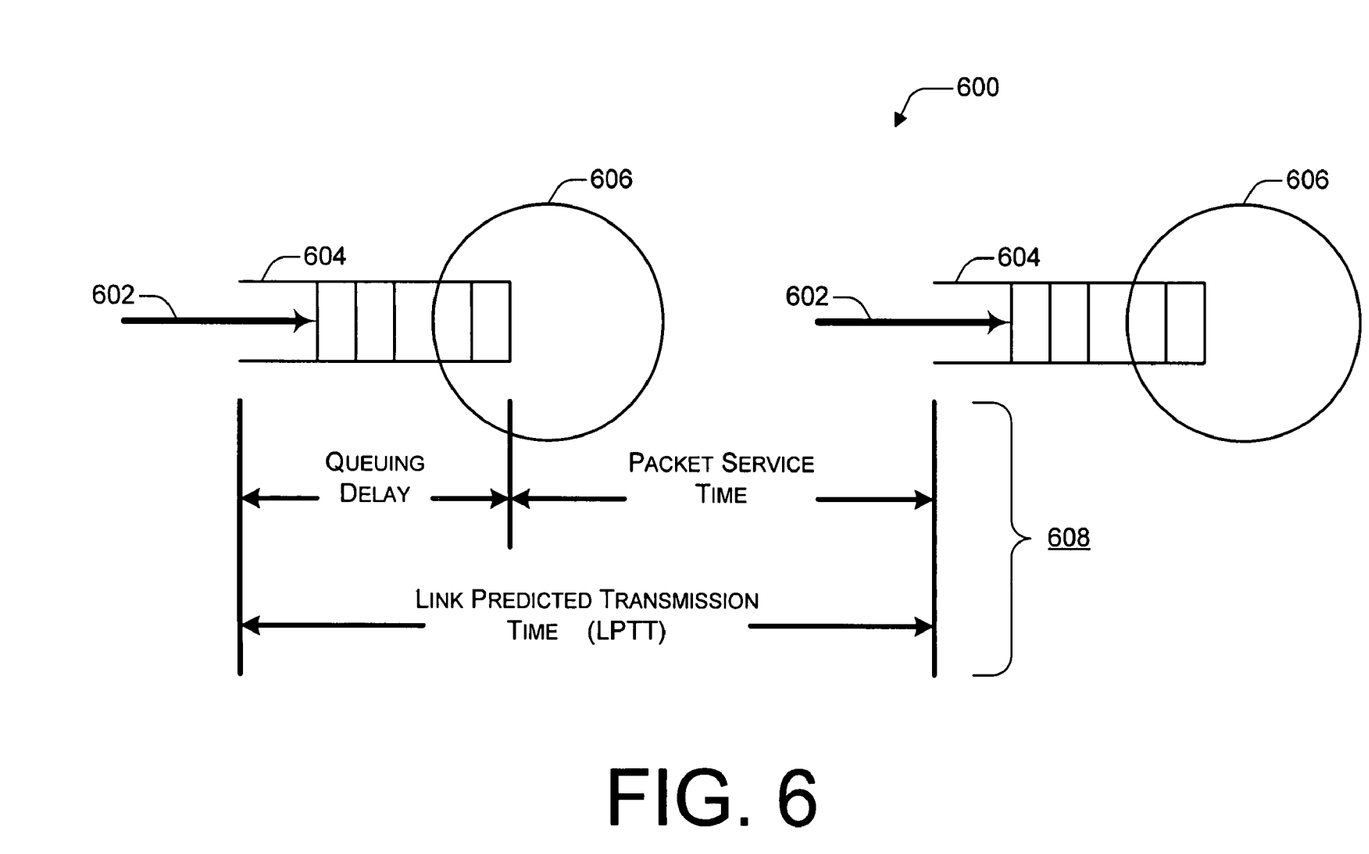
FIG. 6 is a diagrammatic example of link predicted transmission time (LPTT).

FIG. 6 is a diagrammatic example 600 of link predicted transmission time (LPTT). Two wireless nodes are depicted in the diagrammatic example 600. Each wireless node is represented by a packet queue 604 and a transmission indicator 606. Incoming or arriving packets that are entering queues 604 are indicated by arrows 602.

As indicated at bracket 608, the duration that transpires while a packet is within a packet queue 604 is the queuing delay, and the duration between when a packet is transmitted from a first wireless node and when the packet arrives at the packet queue 604 of a second wireless node is denoted as the packet service time. The sum of the queuing delay and the packet service time is the link predicted transmission time (LPTT).

For systems operating in accordance with an IEEE 802.11 protocol, the MAC layer processing time has been studied in terms of the following assumption: every node in the network is assumed to have the same packet collision probability. Although this assumption is relatively accurate for saturated networks, RTC traffic with proper rate control mechanisms does not saturate a network. In an unsaturated network, each node has a different packet collision probability. Consequently, to accurately estimate the MAC layer processing time for a forthcoming RTC flow while taking the self-traffic interference into account, a new MAC model for RTC flows is derived particularly for the IEEE 802.11 protocol.

The MAC model, as described in certain implementations herein, involves estimating the packet collision probability according to the forthcoming flow and its interfering traffic. As is noted above, the self-traffic interference cannot be ignored for RTCs if an accurate estimation is to be made. A packet may collide with the packets of HT traffic, which includes both existing neighboring HT traffic and forthcoming HT self-traffic. The MAC model accommodates this by modeling the packet collision probability as a function of the individual HT traffic of each link. Thus, the modeled packet collision probability can reflect the impact of both neighboring HT traffic and forthcoming HT self-traffic.

Packet Service Time:

The IEEE 802.11 MAC supports two different schemes, which are named the Distributed Coordination Function (DCF) and the Point Coordination Function (PCF). For ad hoc and mesh scenarios, a more reasonable model of operation is the DCF. There are two access methods that are used under DCF: the basic access method and the RTS/CTS access method. The basic access method is relatively simpler and uses DATA and ACK packets; however, it suffers from the well-known hidden-terminal problem. The DCF scheme addresses this problem with the RTS/CTS access method, which is slightly more complex. In the RTS/CTS access method, two more packet types, RTS and CTS packets, are exchanged before transmitting DATA packets.

Packet service time may be calculated according to the specific MAC behavior and the neighboring traffic conditions. An IEEE 802.11-compliant node that intends to send a packet first waits for the channel to be idle and then waits for a backoff period to expire prior to accessing the channel and sending control packets and then data packets. If necessary, some control packets and data packets are retransmitted. Thus, the packet service time includes a channel access time, a backoff time, and transmission time(s) for the control packets and the data packets. The channel access time is related to (e.g., impacted by) the CS traffic. The backoff time and packet transmission time are related to (e.g., impacted by) the HT traffic.

Figure 7:
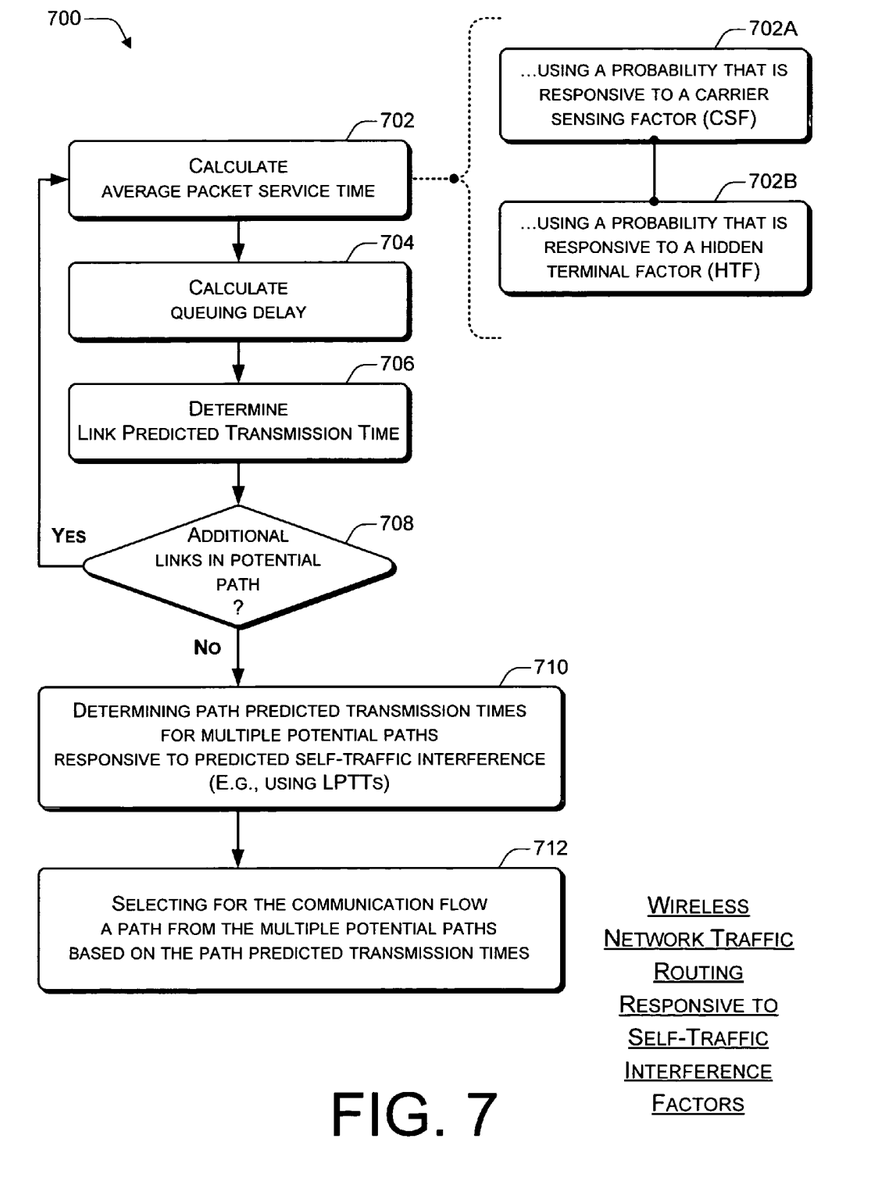
FIG. 7 is a flow diagram that illustrates an example of a quantitative method for wireless network traffic-aware routing responsive to one or more self-traffic interference factors.

FIG. 7 is a flow diagram 700 that illustrates an example of a quantitative method for wireless network traffic-aware routing responsive to one or more self-traffic interference factors. Flow diagram 700 includes six (6) "primary" blocks 702-712 and two (2) "secondary" blocks 702A and 702B. Although the actions of flow diagram 700 may be performed in other environments and with a variety of hardware and software combinations, FIGS. 3, 5, and 6 are used in particular to illustrate certain aspects and examples of the method. By way of example only, the actions of flow diagram 700 may be performed by wireless path selector logic 308 of a wireless node 102.

At block 702, an average packet service time is calculated. For example, an average packet service time as represented in diagrammatic example 600 may be calculated. At block 704, a queuing delay is calculated. For example, a queuing delay as represented in diagrammatic example 600 may be calculated.

The action(s) of block 702 may further include the action(s) of block 702A and/or block 702B. At block 702A, the average packet service time is calculated using a probability that is responsive to a CSF. For example, LPTT determiner 504 may calculate the average packet service time using a probability that is responsive to a CSF that is ascertained by CSF ascertainer 508. At block 702B, the average packet service time is calculated using a probability that is responsive to an HTF. For example, LPTT determiner 504 may calculate the average packet service time using a probability that is responsive to an HTF that is ascertained by HTF ascertainer 514.

At block 706, a link predicted transmission time (LPTT) is determined from the calculated queuing delay and average packet service time. For example, LPTT determiner 504 may determine an LPTT for a given link by combining (e.g., summing) the calculated queuing delay and the calculated average packet service time.

At block 708, it is determined if there are additional links in the path of the forthcoming communication flow under consideration. If so, then flow diagram 700 repeats the calculations and determinations of blocks 702-706 for each respective link of the potential path under consideration. If, on the other hand, it is determined (at block 708) that there are no more links without a determined LPTT, then flow diagram 700 continues at block 710.

At block 710, path predicted transmission times (PPTTs) are determined for multiple potential paths responsive to predicted self-traffic interference using the determined LPTTs. For example, multiple respective PPTTs may be determined using the LPTTs corresponding to the links of each potential path of respective ones of the multiple potential paths. The PPTT determinations may be made using, for example, CSFs and HTFs. CSFs and HTFs are examples of values that reflect predicted self-traffic interference.

At block 712, a path is selected from the multiple potential paths for the forthcoming communication flow based on the PPTTs. For example, a path associated with the shortest PPTT (and thus the highest quality) may be selected from the multiple potential paths for the forthcoming communication flow.

The following notations and assumptions are utilized in the description herein below: Considering a link form host i to host j, let $A_i$ denote the set of hosts in the carrier sensing range of host i. If a host wants to send a packet, it competes for the channel with other hosts in the set $A_i$. Similarly, let $H_{ij}$ denote the set of hosts that are hidden from host i but not from host j. The packet sent from host i to host j may collide with the packets sent from hosts in the set $H_{ij}$.

The following variables DIFS, SIFS, EIFS, and slot are used to denote the time interval of DCF Inter-Frame Space (DIFS), Short Inter-Frame Space (SIFS), Extended Inter-Frame Space (EIFS), and a slot, respectively. The following notations DATA, ACK, RTS, and CTS are used for the time periods of transmitting DATA, ACK, RTS, and CTS packets, respectively. It is assumed for the mathematical derivations below that all the nodes in the network send packets independently; this results in the CS traffic and the HT traffic being exponentially distributed. (Nevertheless, the principles of the mathematical derivations may be generalized beyond these assumptions.) Their average traffic rates are denoted by $\lambda_{A_i}$ and $\lambda_{H_{ij}}$, where $$\lambda_{A_i} = \sum_{k \in A_i} \lambda_k \text{ and } \lambda_{H_{ij}} = \sum_{k \in H_{ij}} \lambda_k.$$

Because both access methods, the basic access method and the RTS/CTS access method, are used in real-world practical networks, both access methods are individually addressed below. More specifically, mathematical derivations of example calculations of LPTT for each of these two access methods under IEEE 802.11 are described below.

Basic Access Method:

In the basic access method, a wireless node transmits a DATA packet if the channel is idle for a period that exceeds DIFS. If the channel is busy, it waits until the end of the current transmission. The sending node further waits for an additional DIFS and a random backoff period, which is determined by a binary exponential backoff algorithm, before transmission. The receiver node replies with an ACK packet to the sender node after receiving the data packet successfully. If the sending node does not receive the ACK within a predefined time period, the whole process is repeated.

Figure 8:
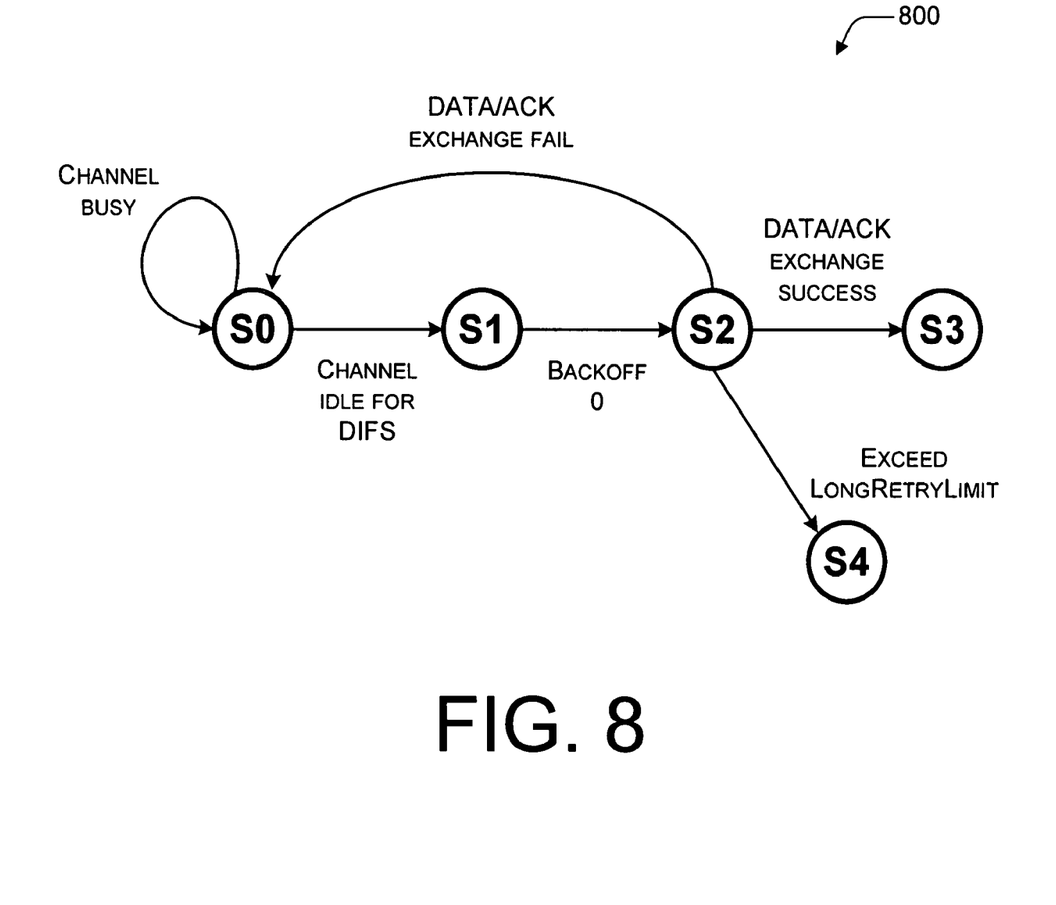
FIG. 8 is an example state diagram for a basic access method in a wireless network.

FIG. 8 is an example state diagram 800 for a basic access method in a wireless network. State diagram 800 is a state transmit diagram for transmitting a DATA packet from node/host i to node/host j. It is particularly applicable to, for example, IEEE 802.11 transmission states. Each circle represents a state, and the label on the connecting curves is the transition condition from one state to the directed state.

There are five (5) states in state diagram 800. These five states are identified as S0, S1, S2, S3, and S4. Generally, state S0 is the initial state. State S1 is the state in which host i senses that the channel is idle for DIFS and starts a backoff timer with a random backoff time. State S2 is the state in which the backoff timer of host i reaches zero and host i sends out/transmits a DATA packet. State S3 is the state in which host j receives the DATA packet. State S4 is the state in which the retransmission time exceeds the LongRetryLimit (LRL).

More specifically, when host i wants to send a packet to host j, it first enters into state S0. In this state, host i senses the channel, if the channel is idle for DIFS period, host i enters state S1. While in state S1, host i delays a random backoff time interval until its backoff counter becomes 0. Afterwards, host i then enters state S2. Otherwise, if the channel is busy during the DIFS period, the state diagram returns to state S0.

While in state S2, host i sends a DATA packet to host j. If the DATA/ACK packet pair are exchanged successfully, host i enters state S3. If the DATA/ACK exchange fails, on the other hand, host i returns to state S0. Also, if the retransmission time exceeds the so-called LongRetryLimit (LRL), host i transitions to state S4, and this packet is dropped. Thus, the average transition time from state S0 to state S3 or S4 is the service time of each packet.

To begin the mathematical derivation, let $P_{DIFS}{}^i$ and $P_{slot}{}^i$ denote the probability of host i successfully sensing that the channel is idle for time intervals DIFS and slot, respectively. Also, $P_{DATA}{}^i$ is used to denote the probability of host i sending a DATA packet successfully.

The probability $P_{DIFS}{}^i$ is equivalent to the probability that no host of the set $A_i$ sends or receives a packet in the time interval of DATA+DIFS. Thus, $$P_{DIFS}{}^i = \exp[-(DATA+DIFS) \times \lambda_{A_i}], \qquad (2)$$

and similarly, $$P_{slot}^i = \exp[-slot \times \lambda_{A_i}]. \quad (3)$$

The DATA packet collision probability $P_{DATA}^i$ is equivalent to the probability that no host of the set $H_{ij}$ sends a packet in the time interval of 2× DATA. Thus, $$P_{DATA}^i = \exp[-2 \times DATA \times \lambda_{H_{ij}}]. \quad (4)$$

To obtain the packet service time, the kth retransmission of a packet from node i to node j is considered. First, node i waits to ensure that the transmission medium is idle for DIFS period of time. This therefore costs $$\frac{DIFS}{P_{DIFS}^i}$$

period of time. The backoff counter then selects a random number of backoff slots.

Figure 9:
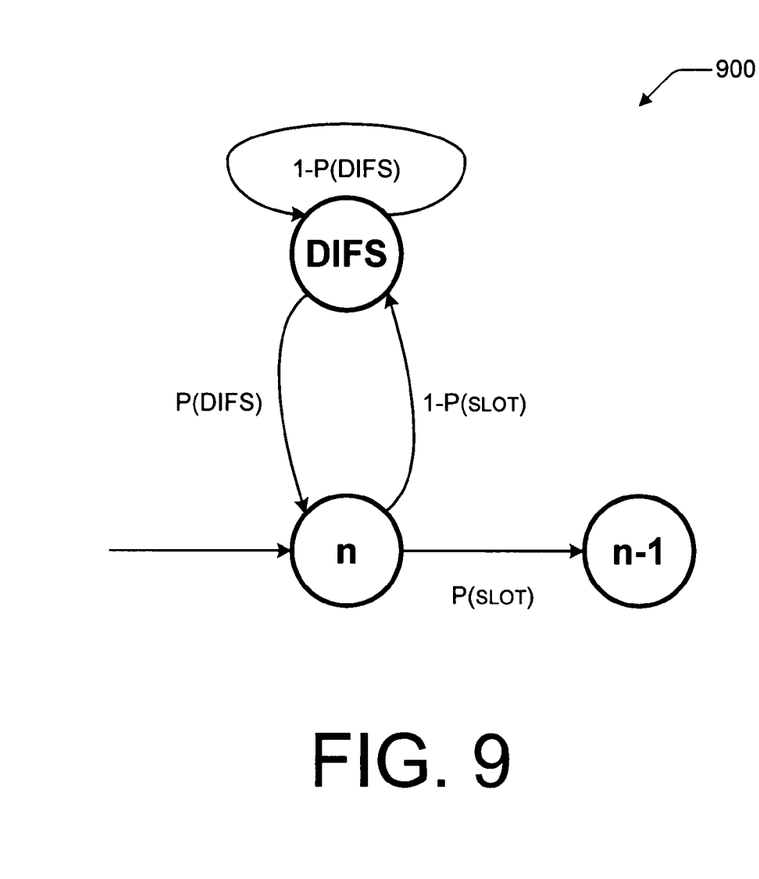
FIG. 9 is an example state diagram for a backoff counter used in access methods for wireless networks.

FIG. 9 is an example state diagram 900 for a backoff counter used in access methods for wireless networks. State diagram 900 is a state transit diagram for a backoff counter. Each circle represents a state, and the label on the connecting curves is the transition condition from one state to the directed state. Generally, the state transition is from n to n−1. If the channel is idle during the slot, the backoff counter is decreased by 1. Otherwise, it is frozen for DIFS until the channel does become idle. There are three (3) states in state diagram 900. These three states are identified as n, n−1, and DIFS.

More specifically, at the state in which the backoff counter is n for a given wireless node, if the channel is idle in the slot, it transits to the next state in which the backoff counter is decreased by 1 (i.e., state n−1). If, on the other hand, there are transmissions by other wireless nodes during the slot, then the given wireless node freezes its backoff counter and resumes the count where it left off, after a DIFS interval in which the channel is idle. Thus, the expected time duration of one backoff slot is $$\tau = \frac{slot}{P_{slot}^i} + \frac{1 - P_{slot}^i}{P_{slot}^i} \times \frac{DIFS}{P_{DIFS}^i}. \quad (5)$$

In an IEEE 802.11 wireless network, the backoff counter value is chosen randomly to be between 0 and a variable termed the contention window CW. The contention window CW is an integer between $CW_{min}$ and $CW_{max}$, with typical values being 31 and 1023. Initially, CW is equal to $CW_{min}$. Upon an unsuccessful transmission, CW is doubled, until it reaches $CW_{max}$. After a successful transmission, CW is again set equal to $CW_{min}$. The average number of backoff slots at the kth retransmission is therefore $$\frac{CW_{min}}{2} \times 2^{k-1}.$$

If the transmission of a DATA packet fails at the kth attempt, the time cost is $$t_k^f = \frac{DIFS}{P_{DIFS}^i} + \frac{CW_{min}}{2} \times 2^{k-1} \times \tau + DATA + EIFS. \quad (6)$$

If a DATA packet is successfully transmitted at the kth attempt, the total time consumed is $$t_k^s = \frac{DIFS}{P_{DIFS}^i} + \frac{CW_{min}}{2} \times 2^{k-1} \times \tau + DATA + SIFS + ACK. \quad (7)$$

The probability that the kth retransmission is successful is $P_{DATA}^i \times (1 - P_{DATA}^i)^{k-1}$.

The average packet service time for the basic access method is therefore:

$$T_{MAC} = \sum_{k=1}^{LRL} P_{DATA}^i (1 - P_{DATA}^i)^{k-1} \left( \sum_{i=1}^{k-1} t_i^f + t_k^s \right) + (1 - P_{DATA}^i)^{LRL} \sum_{k=1}^{LRL} t_k^f \quad (8)$$

RTS/CTS Access Method:

In the RTS/CTS access method, a sending wireless node that intends to send a DATA frame first transmits an RTS packet after the channel is available for a period longer than DIFS and the backoff time reaches zero. When the receiver node receives the RTS packet, it transmits a CTS packet back to the sending wireless node. If the CTS packet is not received within a predefined time interval, the sender node retransmits the RTS packet. After a successful reception of a CTS packet, the sender node can transmit the DATA packet toward the receiver node.

Figure 10:
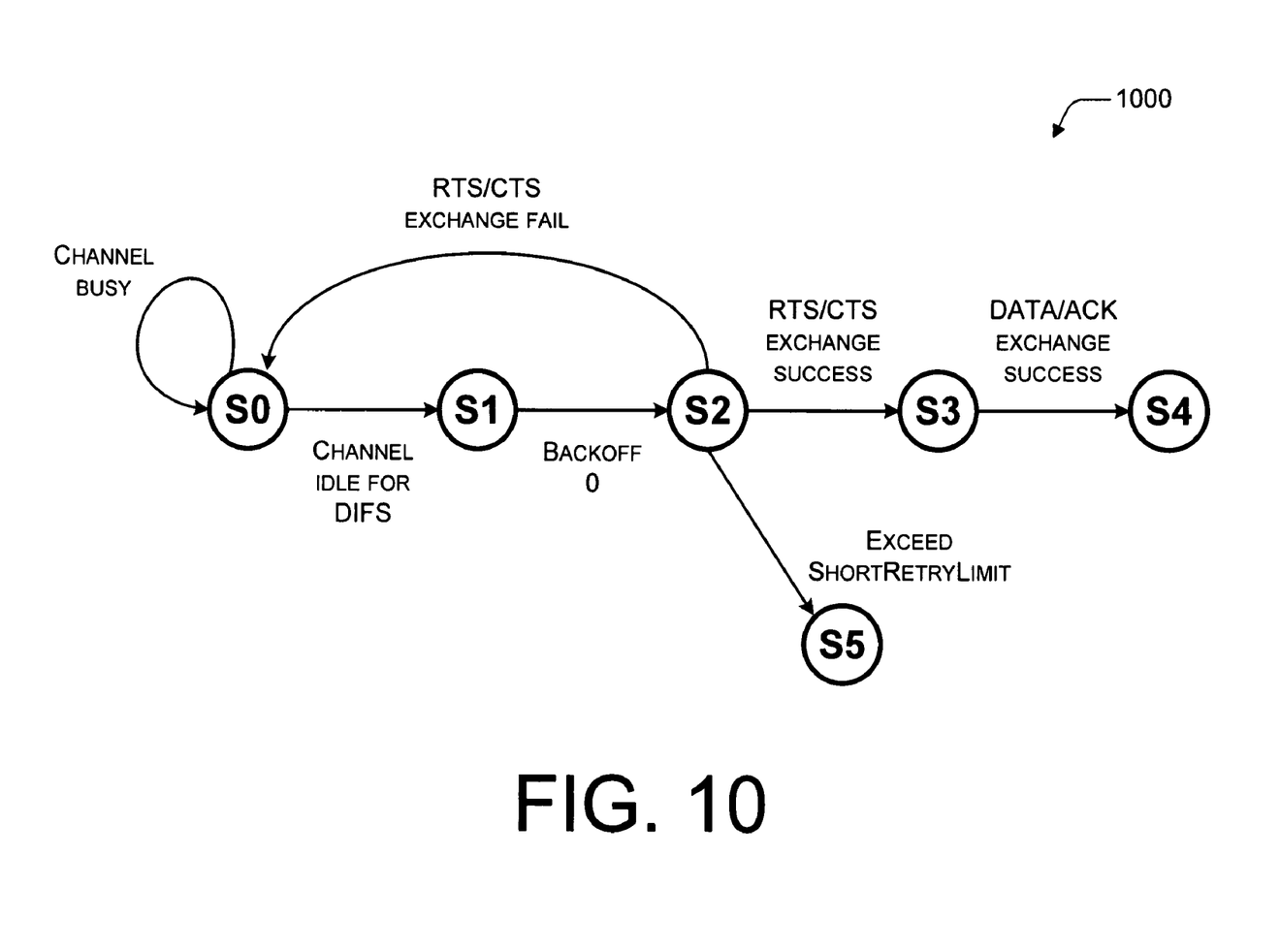
FIG. 10 is an example state diagram for a ready-to-send/clear-to-send (RTS/CTS) access method in a wireless network.

FIG. 10 is an example state diagram 1000 for a ready-to-send/clear-to-send (RTS/CTS) access method in a wireless network. State diagram 1000 is a state transmit diagram for transmitting a DATA packet from node/host i to node/host j using the RTS/CTS access method. Like state diagram 800, it is particularly applicable to, for example, IEEE 802.11 transmission states. To state diagram 800 for the basic access method, state diagram 1000 adds one additional state, the RTS/CTS exchange state.

Thus, there are six (6) states in state diagram 1000. These six states are identified as S0, S1, S2, S3, S4, and S5. Compared to the basic access method, the RTS/CTS access method uses a four-phase RTS-CTS-DATA-ACK handshake. When host i senses that the channel is idle for the DIFS period and the backoff counter reaches zero, it enters into state S2 and sends RTS (instead of DATA) to host j. If the RTS/CTS exchange is successful, host i enters state S3. If the exchange fails, host i returns to state S0.

In this analysis, it is assumed that if the RTS/CTS packets are exchanged successfully, the DATA is also sent successfully. Thus, from state S3, host i enters into state S4. If the retransmission times exceed the ShortRetryLimit (SRL), host i transits to state S5, and this packet is dropped. The packet service time for the CTS/RTS access method is therefore the average transition time from state S0 to state S4 or S5.

The variable $P_{RTS}^i$ is used to denote the probability of host i sending an RTS packet successfully to host j. It is equivalent to the probability that no packet is sent from the hosts of the set $H_{ij}$ in the time of DATA+RTS. Thus, $$P_{RTS}^i = \exp[-(DATA+RTS) \times \lambda_{H_{ij}}]. \quad (9)$$

The kth retransmission of the packet from node i to node j is presented mathematically below. The channel access process and the backoff process are the same as for that of the basic access method. If the transmission of an RTS packet fails at the kth attempt, the time spent for the kth attempt is $$t_k^f = \frac{DIFS}{P_{DIFS}^i} + \frac{CW_{min}}{2} \times 2^{k-1} \times \tau + RTS + EIFS. \quad (10)$$

If the RTS packet is transmitted successfully at the kth attempt, the time consumed for the kth attempt is $$t_k^s = \frac{DIFS}{P_{DIFS}^i} + \frac{CW_{min}}{2} \times 2^{k-1} \times \tau + RTS + \quad (11)$$

$$SIFS + CTS + SIFS + DATA + SIFS + ACK.$$

The probability that the kth retransmission is successful is $P_{RTS}^i \times (1-P_{RTS}^i)^{k-1}$. The average packet service time for the RTS/CTS access method is therefore $$T_{MAC} = \sum_{k=1}^{SRL} P_{RTS}^i (1-P_{RTS}^i)^{k-1} \left( \sum_{i=1}^{k-1} t_i^f + t_k^2 \right) + (1-P_{RTS}^i)^{SRL} \sum_{i=1}^{SRL} t_i^f. \quad (12)$$

Queuing Delay:

To obtain the queuing delay, a known or specially-developed model may be employed. By way of example, a described implementation uses an M/M/1 queuing model. For the M/M/1 queuing model, $\lambda_{ij}$ denotes the packet arrival rate across link (i, j), and the packet service rate is denoted as $\mu_{ij}$, where $\mu_{ij}=1/T_{MAC}$. The queuing delay in accordance with the M/M/1 queuing model is $$T_{queue} = \frac{\lambda_{ij}/\mu_{ij}}{\mu_{ij} - \lambda_{ij}}. \quad (13)$$

After substituting $1/T_{MAC}$ for $\mu_{ij}$ into equation (13), $T_{queue}$ becomes $$T_{queue} = \frac{\lambda_{ij} T_{MAC}^2}{1 - \lambda_{ij} T_{MAC}}. \quad (14)$$

Link Predicted Transmission Time (LPTT):

Thus, after summing the queuing delay and the packet service time, the following result for LPTT is produced:

$$LPTT(\lambda_{A_i}, \lambda_{H_{ij}}, \lambda_{ij}) = T_{queue} + T_{MAC} = \frac{T_{MAC}}{1 - \lambda_{ij} T_{MAC}}. \quad (15)$$

As indicated above, a value for PPTT can be determined by summing individual LPTT values over the length of the potential path under consideration.

PPTT as a Unified Metric for Multi-Radio Networks

The prevalence of multi-radio networks is increasing. Providing each wireless node with multiple-radios can improve the capacity of wireless networks.

Routing in a multi-radio network is quite different from that in a single-radio network. In a multi-radio network, two adjacent nodes or links can choose (i.e., select for use) two non-interfering radios or channels. Consequently, a node can send and receive packets on two non-overlapping radios or channels simultaneously, and two adjacent nodes or links can each send a packet at the same time without mutual interference. The interference of neighboring traffic and self-traffic can therefore be alleviated. Thus, the channel diversity that is available in a multi-radio path can mitigate (if not eliminate) the self-traffic interference. This mitigation capability is a relevant factor for a routing metric to consider in multi-radio networks.

Earlier routing protocols, such as the shortest-path algorithm and the Expected Transmission Count (ETX) protocol, do not perform well in multi-radio networks because they ignore the special characteristics of heterogeneous radios. Examples of such special characteristics are different bandwidths, different interference ranges, and so forth. A later routing protocol having a path metric that was designed for multi-radio networks is called Weighted Cumulative Expected Transmission Time (WCETT). WCETT is a combination of each link's Expected Transmission Time (ETT) that explicitly accounts for interference among links that use the same channel. Experiments indicated that WCETT significantly outperforms the earlier routing protocols in multi-radio environments. The improvement results from the consideration of link bandwidth and channel diversity, which is weighted by a tunable parameter $\beta$. Unfortunately, the selection of $\beta$ impacts the performance of WCETT.

In an implementation of the PPTT scheme as described herein, the carrier sensing factor (CSF) and the hidden terminal factor (HTF) are explicitly used to represent the impact of self-traffic interference. Because these traffics are differentiated according to the channel they are using, these two factors can reflect channel diversity implicitly.

The following example utilizes a 4-hop multi-radio path (e.g., wireless nodes A→B→C→D→E as depicted in FIG. 1) in which each node has two radios operating on a first channel and a second, non-interfering channel. If all links use the same channel, the CSF is 2, and the HTF is 1. However, if links A-B and B-C use the first channel, and links C-D and D-E use the second channel, then link B-C only experiences interference as a result of the self-traffic of link A-B. Hence, the CSF is 1, and the HTF is 0, which is much smaller than in the single-channel case.

In other words, the channel diversity within the multi-radio wireless network can be reflected by the CFS and HTF of each link. In this sense, the PPTT metric can select the path with a larger channel diversity by selecting the path that has a smaller HTF and CSF. Thus, because the PPTT can be used in multi-radio networks without any modifications, the PPTT scheme can act as a unified routing metric for both single-radio and multi-radio networks.

CONCLUSION

A more accurate prediction of transmission time along a path can be achieved by taking into account for a routing metric the future self-traffic effect of the forthcoming communication flow. RTC flows, which usually have critical delay and bandwidth requirements, can particularly benefit from the increased prediction accuracy. As described herein, a prediction-based routing metric termed path predicted transmission time (PPTT) estimates the transmission time for the traffic of the forthcoming flow before it is injected into a wireless network, such as a wireless mesh network. By way of example, the potential path having the minimal PPTT may be selected as the routing decision.

Specifically, a new MAC model that is applicable to, for example, RTC traffic in an unsaturated network is described. The described MAC model estimates the expected transmission time on individual corresponding links. Using this model, the link predicted transmission time (LPTT) is determined responsive to interfering traffics from neighboring nodes, including both carrier sensing (CS) nodes and hidden terminal (HT) nodes. The calculation of LPTT reflects the effects from neighboring traffics and the effect from the forthcoming self-traffic. Thus, PPTT, which is determined from multiple LPTTs of each individual link along the transmission path, offers a unified traffic-aware routing metric for wireless networks. PPTT can also be used as a multi-radio routing metric when calculating the interference effect with respect to different radios.

The devices, actions, aspects, features, functions, procedures, modules, data structures, components, etc. of FIGS. 1-10 are illustrated in diagrams that are divided into multiple blocks. However, the order, interconnections, interrelationships, layout, etc. in which FIGS. 1-10 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, etc. for traffic-aware routing in wireless networks.

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A device that is capable of making a routing decision for a communication flow that is to propagate over multiple nodes of a multi-hop wireless network, the routing decision based on at least two predicted effects from self-traffic of the communication flow,
    wherein one of the as least two predicted effects from self-traffic of the communication flow comprises a predicted bandwidth consumption from direct transmissions for the communication flow, and
    wherein another of the at least two predicted effects from the self-traffic of the communication flow comprises predicted interference from the self-traffic of the communication flow, the predicted interference from the self-traffic being represented by:
        a carrier sensing factor indicating a number of links in a path between a sender and a receiver that are on a same channel and that are in the sender's carrier sensing range; and
        a hidden terminal factor indicating the number of links in a path between the sender and the receiver that are on the same channel and that are in the receiver's carrier sensing range, but that are not in the sender's carrier sensing range.

2. The device as recited in claim 1 wherein the predicted interference from the self-traffic of the communication flow arises from hidden terminal (HT)-type self-traffic.

3. The device as recited in claim 1, wherein the predicted interference from the self-traffic of the communication flow arises from carrier sensing (CS)-type self-traffic.

4. The device as recited in claim 1, wherein the communication flow comprises a real-time communication (RTC) flow having an expected predetermined bandwidth utilization level.

5. The device as recited in claim 1, wherein the device comprises a wireless network node; the wireless network node comprising a wireless adapter, a wireless router, or a computer with wireless capabilities.

6. A device that is capable of making a routing decision for a communication flow that is to propagate over multiple nodes of a multi-hop wireless network, the routing decision based on:
    (i) at least two predicted effects from-self-traffic of the communication flow, the at least two predicted effects comprising a predicted bandwidth consumption from direct transmissions for the communication flow and predicted interference resulting from the self-traffic of the communication flow,
    wherein the predicted interference resulting from the self-traffic being represented by:
        a carrier sensing factor indicating a number of links in a path between a sender and a receiver that are on a same channel and that are in the sender's carrier sensing range; and
        a hidden terminal factor indicating the number of links in a path between the sender and the receiver that are on the same channel and that are in the receiver's carrier sensing range, but that are not in the sender's carrier sensing range;
    (ii) at least one predicted effect from neighboring traffic interference; and
    (iii) a quality prediction that predicts how self-traffic and neighboring traffic will interfere with forthcoming Real Time Communication flow after the Real Time Communication flow is injected into the network.

* * * * *